(12) United States Patent
El-Beltagy et al.

(10) Patent No.: US 8,713,194 B2
(45) Date of Patent: Apr. 29, 2014

(54) METHOD AND DEVICE FOR PEER ARRANGEMENT IN SINGLE SUBSTREAM UPLOAD P2P OVERLAY NETWORKS

(75) Inventors: Mohammed El-Beltagy, Stockholm (SE); Amgad Naiem, Stockholm (SE); Sameh El-Ansary, Stockholm (SE)

(73) Assignee: Peerialism AB, Stocksund (SE)

( * ) Notice: Subject to any disclaimer, the term of this patent is extended or adjusted under 35 U.S.C. 154(b) by 307 days.

(21) Appl. No.: 13/299,981

(22) Filed: Nov. 18, 2011

(65) Prior Publication Data

US 2013/0132602 A1    May 23, 2013

(51) Int. Cl.
*G06F 15/16* (2006.01)

(52) U.S. Cl.
USPC ............ 709/231; 709/201; 709/205; 709/226

(58) Field of Classification Search
USPC .................................. 709/201, 205, 226, 231
See application file for complete search history.

(56) References Cited

U.S. PATENT DOCUMENTS

| | | | |
|---|---|---|---|
| 6,065,062 A | 5/2000 | Periasamy et al. | |
| 6,304,980 B1 | 10/2001 | Beardsley et al. | |
| 6,715,005 B1 | 3/2004 | Rodriguez et al. | |
| 7,698,460 B2 | 4/2010 | Zhang et al. | |
| 7,975,282 B2 | 7/2011 | Deshpande et al. | |
| 7,978,631 B1 | 7/2011 | Abdelaziz et al. | |
| 7,996,547 B2 | 8/2011 | Sudhakar | |
| 8,037,023 B2 | 10/2011 | Liu et al. | |
| 2004/0034791 A1 | 2/2004 | Savathphoune | |
| 2004/0143672 A1* | 7/2004 | Padmanabham et al. | 709/231 |
| 2005/0044147 A1* | 2/2005 | Yap | 709/205 |
| 2006/0190615 A1 | 8/2006 | Panwar et al. | |
| 2006/0259607 A1 | 11/2006 | O'Neal et al. | |
| 2007/0140110 A1 | 6/2007 | Kaler | |
| 2008/0037527 A1 | 2/2008 | Chan et al. | |
| 2008/0205291 A1 | 8/2008 | Li et al. | |
| 2008/0263208 A1 | 10/2008 | White | |
| 2008/0294779 A1 | 11/2008 | Gkantsidis et al. | |
| 2008/0317028 A1 | 12/2008 | Chockler et al. | |
| 2009/0043893 A1 | 2/2009 | Pendarakis et al. | |
| 2009/0106802 A1 | 4/2009 | Zuckerman et al. | |
| 2009/0119265 A1 | 5/2009 | Chou et al. | |
| 2009/0119734 A1 | 5/2009 | Deshpande et al. | |
| 2009/0164576 A1 | 6/2009 | Noh et al. | |
| 2009/0177792 A1 | 7/2009 | Guo et al. | |
| 2009/0234917 A1 | 9/2009 | Despotovic et al. | |
| 2009/0323700 A1 | 12/2009 | Schwan et al. | |
| 2010/0146053 A1 | 6/2010 | Jiang | |
| 2010/0146092 A1 | 6/2010 | Hu et al. | |
| 2010/0146569 A1 | 6/2010 | Janardhan et al. | |

(Continued)

OTHER PUBLICATIONS

*Microsoft Computer Dictionary.* (2002). Redmond, Wash: Microsoft Press. 4 pp.

(Continued)

*Primary Examiner* — Liangche A Wang
(74) *Attorney, Agent, or Firm* — Myers Bigel Sibley & Sajovec, PA

(57) ABSTRACT

The present invention relates to a method of and a device for arranging a P2P overlay network comprising a streaming source and a plurality of peers arranged in distribution layers, the streaming source being arranged to divide data content to be streamed into a plurality of content sub-streams together forming the data content and to distribute the plurality of content sub-streams to the network peers.

25 Claims, 10 Drawing Sheets

(56) References Cited

U.S. PATENT DOCUMENTS

| | | |
|---|---|---|
| 2010/0189259 A1 | 7/2010 | Kaler |
| 2010/0250678 A1 | 9/2010 | Hu et al. |
| 2010/0262709 A1 | 10/2010 | Hiie et al. |
| 2011/0161417 A1 | 6/2011 | Le Scouarnec et al. |
| 2011/0307115 A1 | 12/2011 | Pereira et al. |
| 2012/0030333 A1* | 2/2012 | Hu et al. ............ 709/223 |
| 2012/0210014 A1* | 8/2012 | El-Beltagy ........... 709/231 |
| 2013/0091294 A1* | 4/2013 | El-Beltagy et al. ....... 709/231 |
| 2013/0132601 A1 | 5/2013 | El-Beltagy et al. |

OTHER PUBLICATIONS

International Search Report, Application No. PCT/EP2012/072411, Feb. 20, 2013.

Written Opinion of the International Searching Authority, Application No. PCT/EP2012/072411, Feb. 20, 2013.

International Search Report, Application No. PCT/EP2012/069509, Feb. 28, 2013.

Written Opinion of the International Searching Authority, Application No. PCT/EP2012/069509, Feb. 28, 2013.

Roverso et al., "On the Feasibility of Centrally-Coordinated Peer-To-Peer Live Streaming", *The 8$^{th}$ Annual IEEE Consumer Communications and Networking Conference—Special Session on Scalable Adaptive Multicast in P2P Overlays*, Jan. 9, 2011, pp. 1061-1065.

Roverso et al., "Peer2View a Peer-To-Peer Http-Live Streaming platform", *IEEE 12$^{th}$ International Conference on Peer-to-Peer Computing (P2P)*, Sep. 3, 2012, pp. 65-66.

Small et al., "Scaling Laws and Tradeoffs in Peer-to-Peer Live Multimedia Streaming" *Multimedia '06 Proceedings of the 14th annual ACM international conference on Multimedia*, Jan. 2, 2006, pp. 539-548.

\* cited by examiner

METHOD AND DEVICE FOR PEER ARRANGEMENT IN SINGLE SUBSTREAM UPLOAD P2P OVERLAY NETWORKS

TECHNICAL FIELD

The invention relates to a method and a device for arranging a P2P overlay network.

BACKGROUND

For live video streaming in a client-server approach, the video stream is downloaded from the streaming server (i.e. source) to the client. A video stream consists of a set of consecutive data pieces that the client periodically requests in order to play the video. A scalable live streaming service requires high streaming server bandwidth to satisfy an increasing number of clients over the internet. In order to reduce the cost of the streaming server, Peer-to-peer (P2P) live streaming has been developed. The basic concept of P2P live streaming is to make the clients, referred to as peers in this context, share the load with the streaming server.

P2P live streaming systems have gained a lot of interest in the recent years as it has the advantage of allowing a streaming source to broadcast e.g. a live video event to a large number of peers, without having to provide all the required bandwidth. This is done by making use of the peers' upload capacity to assist the streaming source in broadcasting the content to the peers.

P2P networks comprise any networks composed of entities that each provides access to a portion of their resources (e.g., processing capacity, disk storage, and/or bandwidth) to other entities. The P2P concept differs from traditional client/server architecture based networks where one or more entities (e.g., computers) are dedicated to serving the others in the network. Typically, entities in a P2P network run similar networking protocols and software. Applications for P2P networks are numerous and may for example comprise transporting and/or storing data on the Internet, such as video distribution for content owners.

Many approaches have been developed to efficiently make use of the upload capacity of the peers. These approaches can be divided into two main categories.

Tree-based systems are based on constructing one or more structured trees in an overlay network where peers at the top of each tree feed the peers below them. This approach works well when the peers do not join or leave the system at high frequency as data flow is achieved without any further messages between the peers. However, in a high churn environment, tree maintenance can be very costly and destruction and reconstruction of the tree(s) are sometimes necessary.

Mesh-based systems do not enforce a tree construction, or in other words; peer connectivity does not form a specified overlay, but the peers are connected to each other in an unstructured manner. They exchange data through so called gossip communication or by sending data request messages to each other. A disadvantage with mesh-based systems is that they can have a long setup time, as nodes need to negotiate with each other to find peers. However, many systems use the mesh-based approach as it is very robust to high churn. In such systems each peer has a number of neighbours that it potentially downloads from and failure of any neighbour is thus not as critical as in tree-based approaches.

Although individual peers take decisions locally without a global view in the mesh-based approaches, they can still reach comparable savings to tree based approaches when peer churn is considered, mainly since they do not have to carry the heavy overhead of maintaining a view of the global connectivity structure.

In a tree-based system, a video stream may be divided into a number of sub-streams or stripes. For instance, instead of having a peer download a given data content from a neighbouring peer, it can download half the content as one sub-stream from a first neighbouring peer and the other half of the content as one sub-stream from a second neighbouring peer. Such a division of data content into sub-streams has the advantage that the system can become more resilient to failures if the topology is carefully constructed. One of the known P2P systems using stripes for data content streaming is SplitStream, where topology is designed such that a single peer failure only results in the loss of a single stripe amongst its downloading peers. If sub-streams are constructed using schemes that allow for redundancy such as Multiple Descriptor Coded (MDC) and Forward Error Correction (FEC), the loss of a single stripe will not cause a major disruption in the viewing experience of an end user. A problem associated with the SplitStream approach is its relative inflexibility in connecting peers in the P2P system.

SUMMARY

An object of some embodiments of the present invention is to solve or at least mitigate these problems in the art.

This object may be achieved in a first aspect of the present invention by a method of arranging a P2P overlay network comprising a streaming source and a plurality of peers arranged in distribution layers, the streaming source being arranged to divide data content to be streamed into a plurality of content sub-streams together forming the data content and to distribute the plurality of content sub-streams to the network peers. The method comprises the steps of determining in which one of the distribution layers an individual peer is to be arranged and grouping the peers into a number of peer sets, each peer set being grouped to comprise peers from the same distribution layer and further being arranged to be responsible for distributing a respective content sub-stream. Further, each peer set is assigned a task of distributing said respective content sub-stream to peers of other peer sets arranged in the same distribution layer and to peers arranged in an immediately subsequent layer which further belongs to a peer set being responsible for the distributed respective sub-stream.

This object may be achieved in a second aspect of the present invention by a device for arranging a P2P overlay network comprising a streaming source and a plurality of peers arranged in distribution layers, the streaming source being arranged to divide data content to be streamed into a plurality of content sub-streams together forming the data content and to distribute the plurality of content sub-streams to the network peers. The device comprises a processing unit being arranged to determine in which one of the distribution layers an individual peer is to be arranged, and group the peers into a number of peer sets, each peer set being grouped to comprise peers from the same distribution layer and further being arranged to be responsible for distributing a respective content sub-stream. Further, the processing unit is arranged to assign to each peer set a task of distributing said respective content sub-stream to peers of other peer sets arranged in the same distribution layer and to peers arranged in an immediately subsequent distribution layer which further belongs to a peer set being responsible for the distributed respective content sub-stream.

Thus, some embodiments of the present invention advantageously connect peers to one another in a P2P overlay network in a manner that efficiently exploits all available peer bandwidth while at the same time arranging the peers in an overlay that is resilient to failure. By dividing the data content into a number of sub-streams/stripes, peers are allowed to upload a subset of the data content stream even if the peer upload bandwidth is less than the playback streaming rate. The present invention facilitates better utilization of the P2P network—by restricting peers to download an individual sub-stream from the immediately preceding distribution layer while downloading the remaining sub-streams that form the data content distributed by the streaming source from peers of another peer set in the same layer—in that construction of multiple trees is allowed where two peers can upload and download from each other at the same time. Further, the P2P network becomes highly resilient to failures, in particular if error correction algorithms such as MDC and/or FEC are used since a missing sub-stream can be generated from the remaining sub-streams. Thus, if any peer in the network fails, the other peers downloading from the failing peer will not be affected since they depend on the failing peer with one sub-stream only and can generate the lost sub-stream from the remaining sub-streams until overlay maintenance is undertaken and the failure is taken care of. Overlay maintenance is done periodically and in practice, the overlay network is rebuilt from the top layers, i.e. those closest to the streaming source, and peers are added to the lower layers while system constraints are preserved.

In an embodiment of the present invention, the streaming source is instructed to distribute the different content sub-streams in a substantially equal number to the distribution layer being arranged closest to the streaming source. It should be noted that this constraint may be programmed into the streaming source such that it is always conformed with. Thus, it may not be necessary to instruct the steaming source to evenly distribute the sub-streams each time overlay maintenance is undertaken. In a further embodiment, the peers of each distribution layer are also instructed to distribute the different content sub-streams in a substantially equal number. Advantageously, by distributing the streaming source upload capacity more or less evenly over all sub-streams, i.e. by having the distribution layer closest to the source receive an equal number of each individual sub-stream where each individual sub-stream only is received by the set of peers responsible for uploading it this stripe (and to have an even distribution of the peer's upload capacity for each sub-stream), no individual sub-stream will run out of available uploaders before the rest of the sub-streams.

In a further embodiment of the present invention, it is determined for each distribution layer, starting from the layer being arranged closest to the streaming source, the maximum number of sub-streams that can be distributed to peers to be arranged in an individual distribution layer as the sum of the number of sub-streams that can be distributed from said individual distribution layer and the number of sub-streams that can be distributed from the immediately preceding distribution layer. Thereafter, the peers are arranged in the distribution layers until all peers have been assigned to a respective distribution layer. This has the advantage that the number of upload sources for each downloading peer can be increased or even maximized. A further advantage is that possible variations in upload bandwidth of the peers are taken into consideration. Thus, when arranging the peers in the P2P overlay network, the individual bandwidth of each peer is accounted for.

In still another embodiment of the present invention, the maximum number of sub-streams that can be distributed to peers to be arranged in an individual distribution layer is set to be equal to the number of sub-streams that can be distributed from the immediately preceding distribution layer, in case the previously mentioned sum exceeds the number of sub-streams that can be distributed from the immediately preceding distribution layer. This is advantageous in that it is assured that not more peers are arranged in a given layer than there are seats in the layer preceding it.

In a further embodiment of the present invention, peer connectivity is undertaken in that each peer in the respective peer set is instructed to download its respective content sub-stream from a peer in an immediately preceding distribution layer and to download remaining content sub-streams from peers of the other peer sets arranged in the same layer.

In yet another embodiment of the present invention, the instructing of each peer in the respective peer set which particular content sub-stream to download can further be improved in that it is determined for each peer set in the immediately preceding distribution layer with respect to the instructed peer, the number of sub-streams that the respective peer set is capable of distributing. Thereafter, the particular content sub-stream is selected for download from the peer set having smallest determined distribution capability. Advantageously, the sub-stream that has the smallest amount of upload seats is selected in order to distribute upload capacity of the peers evenly among the content sub-streams in the network.

In still another embodiment of the present invention, at least one selected peer is assigned a task of distributing, in case the at least one selected peer has unutilized distribution capacity, the respective content sub-stream for which it is responsible to at least one peer arranged in an immediately subsequent layer requiring the particular content sub-stream, but which is responsible for a different sub-stream. Hence, this upload is made even though the two peers are not responsible for the same sub-stream. Advantageously, unutilized capacity of peers in the preceding layer is used, which advantageously is an effective approach of streaming data content. Further, the number of hops is reduced since the peer in the subsequent layer need not download the required sub-stream from another peer in the same layer, which directly translates into a smaller playback delay. Finally, this approach frees capacity which otherwise would have been utilized from the subsequent layer for distributing the particular sub-stream. It should be noted that this approach in practice is relatively infrequently used; usually not for more than a couple of peers per layer in a layer containing hundreds or thousands of peers.

In another embodiment of the present invention, at least one selected peer is assigned a task of distributing at least one content sub-stream for which it is not responsible but has downloaded, to at least one peer arranged in the same distribution layer requiring the at least one content sub-stream, in case said at least one peer arranged in the same distribution layer otherwise would have to download the required content sub-stream from the streaming source. Hence, it is advantageous from a bandwidth utilization point of view to download a required sub-stream from another peer—even though that particular peer does not belong to a peer set being responsible for the required sub-stream—than to burden the streaming source with the download. As in the case of the previously described embodiment, this is a relatively unusual approach given the total number of peer assignments in a P2P overlay network.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
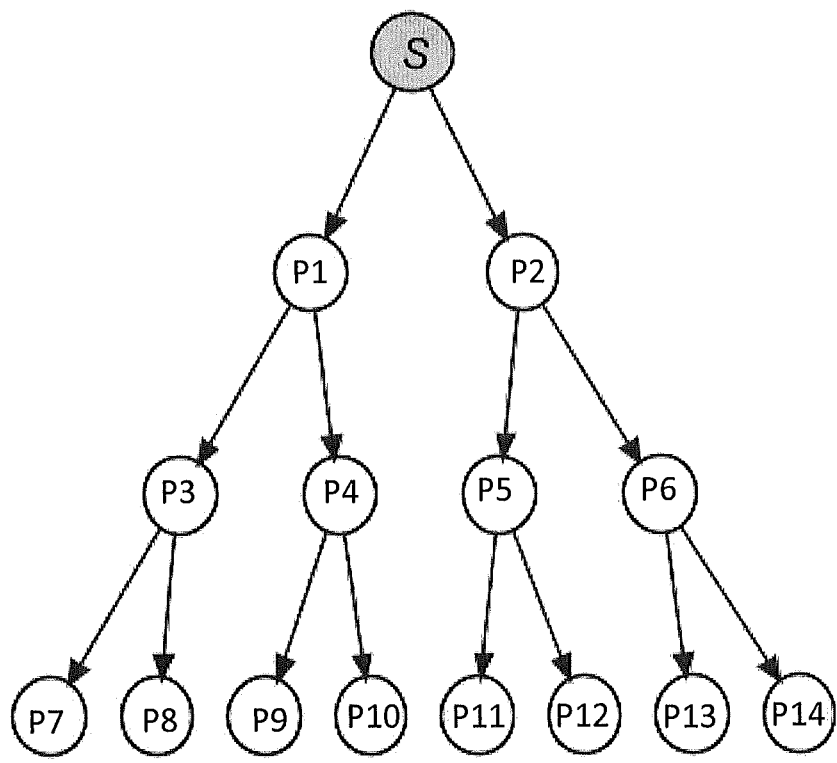
FIG. 1 illustrates a prior art P2P network with a single tree overlay.

FIG. 1 exemplifies a prior art P2P network with a single tree overlay. As can be seen, peers are arranged in rows or distribution layers. Thus, two peers are arranged in distribution layer 1, i.e. the layer closest to streaming source S, four peers are arranged in distribution layer 2 and eight peers are arranged in distribution layer 3. To illustrate, the streaming source S distributes a given data content to peer P1, which in its turn distributes the data content to peers P3 and P4. Finally, peer P3 distributes the given data content to both peers P7 and P8, while peer P4 distributed the data content to peers P9 and P10. A drawback with the single tree overlay of FIG. 1 is that the peers in the last row are idle and their upload capacity is not utilized. This is an ineffective approach, which leads to a higher load on the remaining peers and the streaming source.

Figure 2:
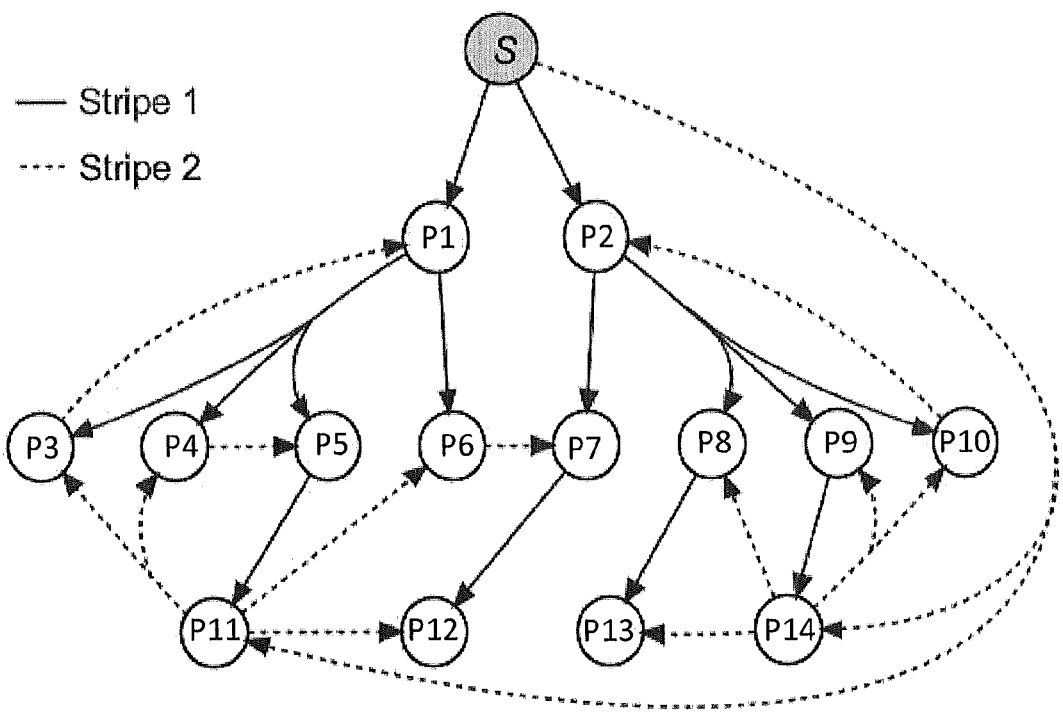
FIG. 2 shows the P2P network of FIG. 1, but in which a SplitStream overlay construction approach is used.

FIG. 2 shows the P2P network of FIG. 1, but in which the SplitStream overlay construction approach is used. The main advantage of this approach is the utilization of the upload bandwidth of all the peers in the network. However, in comparison to the overlay construction of FIG. 1, the SplitStream approach may have the effect that some of the peers that were close to the source S now are further away from the source in terms of distribution layers (i.e. they will have a greater playback delay), while other peers that were further away from the source now are closer. The number of distribution layers from the streaming source will however not increase. As previously mentioned, this approach utilizes sub-streams also referred to as stripes. Thus, a stream is divided into a number of sub-streams sometimes referred to as stripes. For instance, if the stream rate is 1 Mbps, and 4 stripes are used, each stripe would constitute a sub-stream of 256 kbps. Given a peer with an upload capacity of 1.5 Mbps which distributes data to six other peers with a maximum upload capacity of 256 kbps, this peer is said to have six "seats" since it can upload six stripes simultaneously to other peers with a predetermined upload bandwidth. Such division of bandwidth and seats is made such that a peer arranging device in the P2P overlay network is provided with a simple model of the bandwidth/upload capacities of the peers. In a case where data of an original stream is spread over a number of sub-streams, where none of the sub-streams comprises overlapping data, each peer needs to be downloading all the sub-streams in order to be able to completely reconstruct the original stream. Such a system more effectively exploits the capacity of each and every peer in the network.

In FIG. 2, the original stream is divided into two stripes, where stripe 1 is denoted by means of continuous lines and stripe 2 is denoted by means of dashed lines. It can be seen that each peer downloads both stripe 1 and stripe 2 such that the original stream can be reconstructed. In terms of playback delay, consider the following: for peers P1 and P2 in FIG. 1, the delay for playing back a piece of content with respect to source real-time playback point is T, the delay for P3-P6 is 2×T, and the delay for P7-P14 is 3×T, and so on.

Assuming that the bandwidth of each peer in FIG. 2 is the same as that for FIG. 1, stripe 1 will be uploaded to P1 from streaming source S in T, but stripe 2 on the other hand will be uploaded to P1 via P11 and P3. Given that the piece of content of FIG. 1 corresponds to a concatenation of stripe 1 and stripe 2 in FIG. 2, the delay for P1 would thus amount to 3 T for the same piece of content. An analogue reasoning can be made for P2. On the other hand, in case of e.g. P6, stripe 1 will be uploaded from S via P1 in time T+T=2 T, and stripe 2 will be uploaded via P11 and P6 in time T+T (given that P6 has the capacity to simultaneous upload stripe 1 from P1 and stripe 2 from P11). It will thus take 2 T to upload stripe 1+stripe 2. The delay for P6 would thus amount to T for the same piece of content. Consequently, when comparing the overlay of FIG. 2 with that of FIG. 1, P1 will experience a longer delay than P6.

However, since all peers in the overlay of FIG. 2 are capable of distributing data content, savings in streaming source bandwidth will increase. The implementation of this approach however requires a Distributed Hash Table (DHT) implementation which adds an additional load and requires processing to achieve load balancing and high performance in the network. In addition, the SplitStream approach does not handle variable bandwidth among peers and thus assume that all the peers in the network have the same upload bandwidth.

Figure 3:
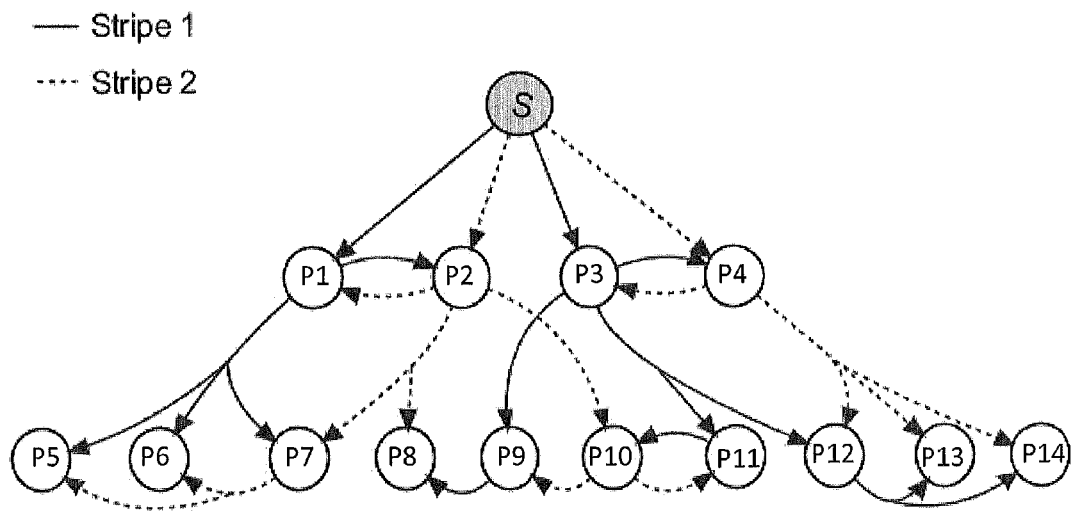
FIG. 3 illustrates the P2P network set forth in FIGS. 1 and 2, but where the peers have been arranged in an overlay network in accordance with an embodiment of the present invention.

FIG. 3 illustrates the P2P network set forth in FIGS. 1 and 2, but where the peers have been arranged in an overlay network in accordance with an embodiment of the present invention. As previously have bee mentioned, a major advantage of the overlay construction of embodiments of the present invention method is that, in addition to utilizing the upload bandwidth of all the peers in the network, the number of distribution layers is minimized, or at least reduced, in that the full upload capacity is utilized for peers arranged closer to the streaming source. Hence, the average number of hops from the streaming source to the peers is reduced, which directly translates into smaller playback delays. Thus, as compared to the network overlays illustrated in FIGS. 1 and 2, the network overlay created by means of the present invention both utilizes peer bandwidth in an effective manner as well as reducing playback delay.

When the P2P overlay network is up and running, as is shown in FIG. 3, the peers and the streaming source take an active role while a device known as a tracker (not shown in FIG. 3) is more passive. However, when an overlay initially is to be set up, or in case of e.g. peer failure, or if peers leave the network and new peers enter, etc., the tracker is the network key component. As previously has been mentioned overlay maintenance is done periodically and in practice, the overlay network is rebuilt from the top layers, i.e. those closest to the streaming source, and peers are added to the lower layers while system constraints are preserved. This is effected by the tracker.

Figure 4A:
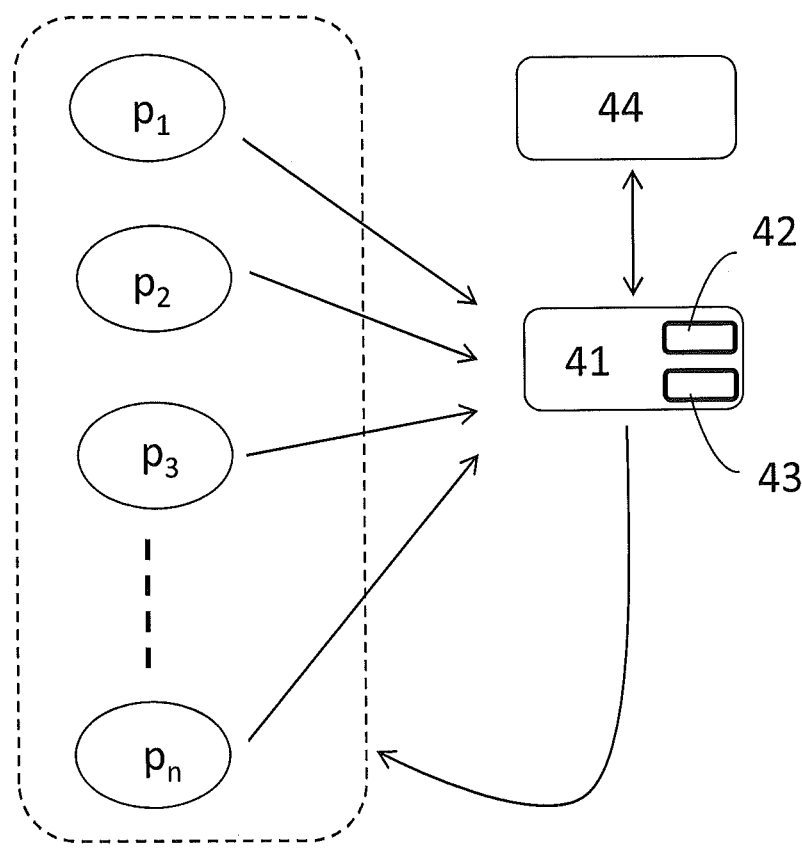
FIG. 4a shows a P2P network in which the present invention can be implemented.

FIG. 4a shows a P2P network in which the present invention can be implemented. A plurality of peers $p_1, p_2, p_3, \ldots, p_n$ is to be arranged in an overlay (e.g. as illustrated in FIG. 3) by tracker 41 with which the peers communicate via interface 42. Further, the tracker is able to communicate with streaming source(s) 44, which provides the peers with data content. For instance, the tracker may need information about the streaming capacity of the source, and the tracker may need to send instructions to the source on how to distributed data content to the peers in the distribution layer located closest to the source. The tracker 41 is typically a device with computing capability facilitated by microprocessor(s) 43. Generally, the tracker is implemented as a computer executing appropriate software stored in associated memory for procuring required functionality. However, other suitable devices with computing capabilities could be used, e.g. an application specific integrated circuit (ASIC), a field programmable gate array (FPGA), a complex programmable logic device (CPLD), etc., in order to control a P2P system and arrange an overlay in accordance with the present invention, while executing appropriate downloadable software stored in a suitable storage area, such as a RAM, a Flash memory or a hard disk. In the P2P network, the tracker 41 receives information of joining and existing peers $p_1, p_2, p_3, \ldots, p_n$, for instance bandwidth capacity of each peer and determines in which distribution layer a joining peer is to be arranged, or to which layer in existing peer is to be transferred. To this end, the tracker may send each peer a list of other peers that the peer can connect. In this way, a complete P2P overlay structure is created.

Figure 4B:
FIG. 4b illustrates a method of arranging a P2P overlay network according to an embodiment of the present invention.

With further reference to FIG. 4b, in an embodiment of the present invention, the tracker 41 of FIG. 4a determines in a first step S401 in which of the distribution layers $r_i$ an individual peer is to be arranged.

Then, for each distribution layer the peers are in step S402 grouped into a number h of sets denoted $\psi(r_i, k)$, where k belongs to $\{1, \ldots, h\}$ for all k. Thus, in set $\psi(r_i, k)$, peers are responsible for uploading sub-stream k to the peers in the immediately subsequent layer $r_{i+1}$, as well at to those in the same layer $r_i$. Consequently, each individual peer set in a certain layer is responsible for distributing a certain sub-stream. The tracker assigns in step S403 this task to the peers in order for the peers to conform with this constraint.

Subsequently, the tracker effects peer connectivity such that each peer in the set $\psi(r_i, k)$ receives sub-stream k from the peers $\psi(r_{i-1}, k)$ responsible for that particular sub-stream in the immediately preceding layer and further receives any other sub-stream k' from peers $\psi(r_i, k')$ responsible for sub-stream k' in the same layer. Hence, each peer in the respective peer set is instructed by the tracker to download one of the content sub-streams from a peer in an immediately preceding distribution layer and to download remaining content sub-streams from peers of another peer set arranged in the same layer.

As was discussed hereinabove, since peers in the set $\psi(r_i, k)$ are responsible for uploading sub-stream k to peers in the same layer $r_i$ as well as to selected peers $\psi(r_{i+1}, k)$ in the immediately subsequent layer, the layers in the overlay network are constructed in an embodiment of the invention such that the sum of the upload capacity of the peers in set $\psi(r_i, k)$ must be at least equal to $|\psi(r_{i+1}, k)| + \Sigma_{k', k' \neq k} |\psi(r_{i+1}, k')|$.

Figure 5:
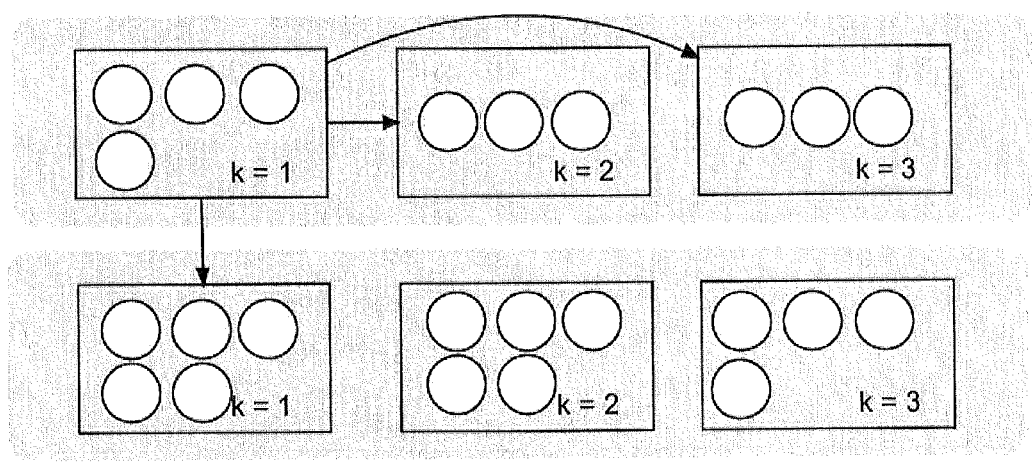
FIG. 5 illustrates peers arranged in a P2P overlay network according to an embodiment of the present invention.

This is illustrated in FIG. 5, where the peers in $\psi(r_i, 1)$ uploads sub-stream 1 to peers in set $\psi(r_i, 2)$, $\psi(r_i, 3)$ and $\psi(r_{i+1}, 1)$. Further, the peers in set $\psi(r_i, 2)$ will upload sub-stream 2 to peers in set $\psi(r_i, 1)$, $\psi(r_i, 3)$ and $\psi(r_{i+1}, 2)$, while the peers in set $\psi(r_i, 3)$ will upload sub-stream 3 to peers in set $\psi(r_i, 1)$, $\psi(r_i, 2)$ and $\psi(r_{i+1}, 3)$.

In order to take into account possible variations in upload bandwidth of the peers, peer bandwidth is defined. In the P2P network, a total number U of peers are connected. Each peer u belonging to U has a download bandwidth capacity $c_i(u)$ and an upload bandwidth capacity $c_o(u)$. It is assumed that $c_i(u)$ always is equal to or greater than the playback streaming rate $\omega$ for the data content which is streamed from the source. If it would be less, playback would not be possible. Each peer is hence able to upload the following number of sub-streams:

$$s_o(u) = \left\lfloor \frac{c_o(u)h}{\omega\alpha} \right\rfloor \quad (1)$$

where $\alpha$ is the so called download to playback streaming rate factor. Higher values of $\alpha$ implies that a downloading peer will be able to fill its playback buffer faster. As previously has been mentioned, the number of sub-streams $s_o(u)$ that a peer can upload is referred to as the seating capacity of peer u. In other words, peer u has $s_o(u)$ seats available for download.

Each layer $r_i$ contains a plurality $P(r_i)$ of peers, while the first layer $r_0$ contains the streaming source(s). In accordance with embodiment of the present invention, a given peer in row $r_i$ for i>0 can download sub-streams from either:

peers $P(r_{i-1})$ in the immediately preceding distribution layer, or peers $P(r_i)$ in its own layer.

Each layer has $s_a(r_i)$ available seats that can used by $P(r_{i+1})$ peers for downloading sub-streams. Seat availability within the i:th layer is calculated as:

$$s_a(r_i) = \sum_{u' \in P(r_i)} s_o(u') + s_a(r_{i-1}) - |P(r_i)|h. \quad (2)$$

Thus, the tracker starts from layer $r_0$ (i.e. the distribution layer hosting the streaming source(s)) and calculates the maximum number n of peers that can attach to layer $r_0$, according to:

$$n = \min\left\{\max\left\{k : \underbrace{\overbrace{\sum_{j=c}^{c+k} s_o(u_j)}^{\text{within-layer seats}} + \overbrace{\frac{s_a(r_{i-1})}{s_a(r_{i-1})}}^{\text{seats from above layer}}}_{\text{supply}} \geq \underbrace{kh}_{\text{demand}}\right\}, s_a(r_{i-1})\right\}, \quad (3)$$

where the tracker aims at finding the maximum number of peers that can be provisioned by the free seats in the layer above it as well as seats within the layer itself.

In other words, the tracker determines—for each distribution layer starting from the layer hosting the streaming source—the maximum number of sub-streams that can be distributed to peers to be arranged in a given distribution layer as the sum of the number of sub-streams that can be distributed from the given distribution layer and the number of sub-streams that can be distributed from the immediately preceding distribution layer. Thereafter, the tracker arranges the peers in the distribution layers until all peers have been assigned to a respective distribution layer.

It is mentioned hereinabove that the tracker may submit to a peer a list of other peers which it can connect to. However, it is to be noted that the peers assigned to the distribution layer being arranged closest to the streaming source are instructed to connect to the streaming source, and to at least another peer being arranged in the same distribution layer but belonging to another peer set, for downloading the content sub-streams.

Peers are limited in their ability to exchange sub-streams by their upload capacity $s_o(u)$, which of course could be a limiting factor in determining the number $P(r_i)$ of peers in a layer. However, a feature of embodiments of the present invention is that each peer $P(r_i)$ should be able to download at least one sub-stream from the layer immediately preceding it. Hence, there is an upper bound on the number of peers that can download from layer $r_{i+1}$, which is stipulated by $s_a(r_i)$. That is, $P(r_{i+1}) \leq s_a(r_i)$, or in other words: the tracker cannot arrange more peers in a given layer than there are seats in the layer preceding it. Therefore, in an embodiment of the present invention, should the sum of Equation 3—for which the tracker attempts to find a maxima—exceed the number of sub-streams that can be distributed from the immediately preceding distribution layer, the maximum number of sub-streams that can be distributed to peers in a given distribution layer will be set to be equal to the number of sub-streams that can be distributed from the immediately preceding distribution layer. The tracker finishes the procedure when either all the peers have been assigned to layers, or when the row upload capacity $s_a(r_i)$ decreases to a point where not a single peer can be provided for.

In an embodiment of the present invention, the instructing of each peer in the respective peer set which particular content sub-stream to download can further be improved. In this embodiment, the tracker loops over all layers containing downloading peers, starting from the layer closest to the streaming source. Each peer in the current layers is assigned to download a particular sub-stream k from a peer in immediately preceding layer, which peer is included in peer set $\psi(r_i, k)$. For each row $r_i$ and sub-stream k, the total number $\rho(r_i, k)$ of sub-streams that the peers in set $\psi(r_i, k)$ is capable of uploading is defined.

The tracker selects the "best" sub-stream k for a peer to download according to:

$$k = \arg\min_{l \in \{0,\ldots,h-1\}} \{\rho(r_i, l) + \rho(r_{i-1}, l) \mid \rho(r_{i-1}, l) > 0\} \quad (4)$$

Thus, the tracker selects for download the sub-stream that has the smallest amount of upload seats in order to distribute upload capacity of the peers evenly among the h sub-streams in the network. Consequently, in this embodiment, the tracker determines, for each peer set in the immediately preceding distribution layer with respect to the peer to be instructed to download a particular content sub-stream, the number of sub-streams that the respective peer set is capable of distributing. Thereafter, the tracker selects the one of the individual content sub-streams for download from the peer set having smallest determined distribution capability.

It should be noted that the tracker can assign to peers a task of distributing, in case the peers have unutilized distribution capacity, the respective content sub-stream for which the these peers are responsible to one or more other peers arranged in an immediately subsequent layer requiring the particular content sub-stream, but which other peers are responsible for a different sub-stream, in order to exploit unutilized capacity of the peers which are assigned with the task.

It should further be noted that the tracker can assign to peers a task of distributing one or more content sub-streams for which it is not responsible (but has downloaded), to other peers in the same distribution layer requiring the content sub-stream(s), in case these other peers otherwise would have to download the required content sub-stream from the streaming source. Thus, it is advantageous from a bandwidth utilization point of view to download a required sub-stream from another peer—even though that particular peer does not belong to a peer set being responsible for the required sub-stream—than to burden the streaming source with the download.

Both these practices are relatively infrequently used given the total number of peer assignments in a P2P overlay network. Usually, these types of assignments are only used for a small percentage of the peers of a layer (in a layer typically containing hundreds or thousands of peers this will seldom exceed 1%).

In a further embodiment of the present invention, peer assignment is further improved by exploiting a linear sum assignment approach. Assigning peers to seats—i.e. assigning a peer to (a) a peer in the immediately subsequent layer and/or (b) to a peer in the same layer—can hence be modelled as a Linear Sum Assignment Problem (LSAP) by the tracker. An instance of LSAP needs to be solved for every two consecutive distribution layers. A well-known and oftentimes used algorithm for solving LSAP is e.g. the Auction algorithm. Sub-stream allocation to peers is done in manner to prevent a situation from occurring where there are no available upload peers to provide a sub-stream to a peer that needs it. Further, LSAP allows for optimization of peer connectivity with respect to some predetermined specified metric such as network proximity (which affects latency) and NAT connectivity (which may impose data streaming restrictions on peers).

In this context, a request from a peer u to download a single sub-stream k from any given seat is defined as $d_{uk}$. The assignment of peers to seats in accordance with this embodiment of the present invention is carried out by the tracker in four different steps with reference made to FIGS. 6-10. As was mentioned hereinabove, for each two consecutive distribution layers $r_i$ and $r_{i+1}$, starting from i=0 and ending at the last layer, an LSAP is solved resulting in an optimization of the assignment of peers to seats. Thus, an optimization procedure is undertaken between a set of peers $P(r_{i+1})$ in distribution layer $r_{i+1}$ and a corresponding set of uploading seats $s_a(r_i)$ in the immediately preceding distribution layer $r_i$ according to a predetermined metric. Each potential assignment of a peer to a seat is associated with a value representing a quality measure of the predetermined metric, i.e. the value indicates how "good" a connection is given the predetermined metric. The objective of the LSAP is to assign each peer to a seat with a maximum assignment value.

Figure 6:
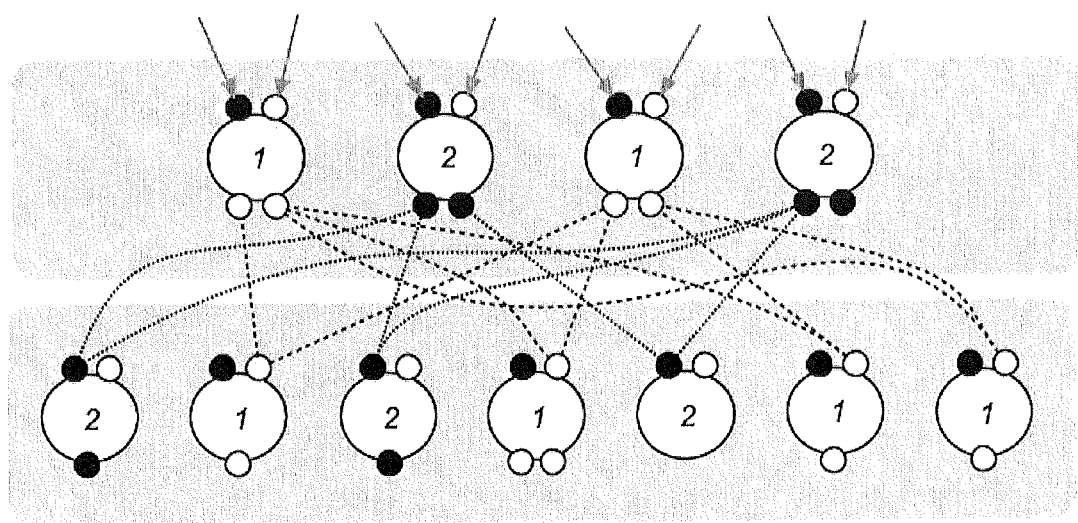
FIG. 6 illustrates peers to be assigned in a P2P overlay network.

FIG. 6 illustrates a subsection of a P2P overlay network with four peers in a first layer $r_i$ and seven peers in a subsequent second layer $r_{i+1}$. Further, two different sub-streams are to be uploaded. Thus, each peer requites two sub-streams to fully render data content streamed by a source. In accordance with embodiments of the present invention, a peer is allowed to upload a sub-stream to another peer in an immediately subsequent layer in case the two peers belong to a respective set being responsible for the same sub-stream. In FIG. 6, the peers in the second layer have still not been assigned to seats. Numerals 1 and 2 at the peers indicate the respective sub-stream that each peer will be responsible for uploading. For illustrative purposes, sub-stream 1 is indicated in white at the peers, while sub-stream 2 is indicated in black. The dashed lines indicate possible assignment of peers in the second layer to seats in the first layer for downloading of sub-stream 1, whereas the dotted lines indicate possible assignment of peers in the second layer to seats in the first layer for downloading sub-stream 2.

In a first step, each peer u in $\psi(r_{i+1}, k)$ makes a request $d_{uk}$ for a single sub-stream. The uploading seats are the available seats $s_a(u)$ for each peer u in $\psi(r_{i-1}, k)$. This is repeated for $\forall k \in \{1, \ldots, h\}$. To exemplify, the left-most peer in layer $r_{i+1}$ can download sub-stream 2 from either the second of fourth peer from the left in layer $r_i$. This is for illustrative purposes only; in practice, a peer may have hundreds and even thousands of potential uploading peers for a desired sub-stream. Thus, an LSAP is formulated on the basis of a predetermined metric as discussed in the above, and an assignment value is attained as a result thereof.

Figure 7:
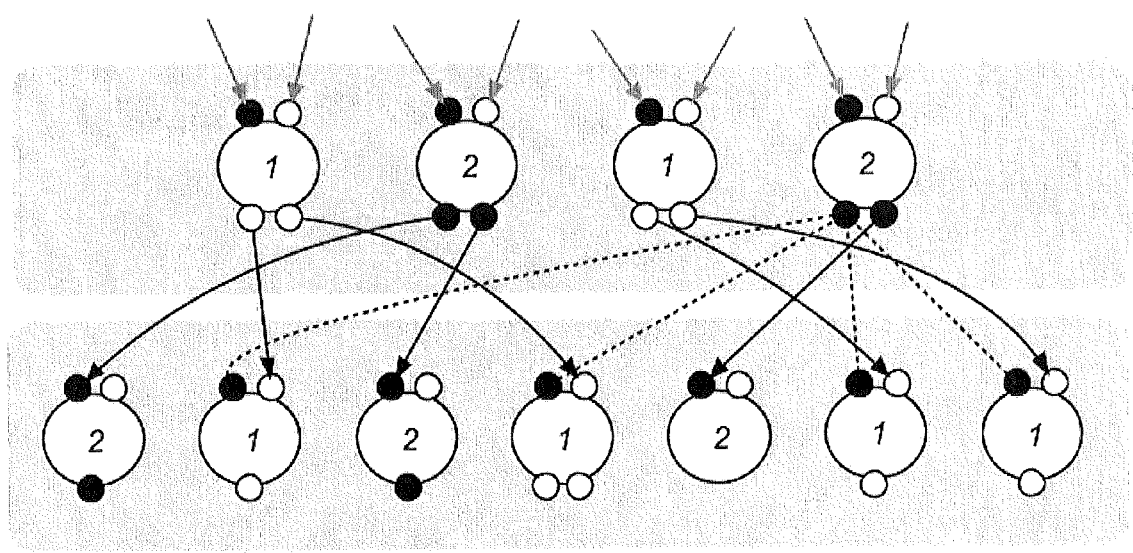
FIG. 7 illustrates peer assignment according to an embodiment of the present invention.

With reference to FIG. 7, the assignments made in the first step are illustrated by means of continuous lines. For instance, it is illustrated that the LSAP and the associated assignment value advocated download of sub-stream 2 from the second peer from the left in layer $r_i$ for the left-most peer in the second layer $r_{i+1}$. Further, a situation may arise where a peer has free capacity after peer assignment has been undertaken. In this particular example, the right-most peer in the first layer has capacity to upload a further sub-stream, and no free capacity should ultimately be wasted in the P2P overlay network. Thus, if this situation occurs, a sub-stream can in an embodiment of the present invention be uploaded by a peer arranged in layer $r_i$ to a peer of a subsequent layer $r_{i+1}$, even though the two peers are not responsible for uploading the same sub-stream. In FIG. 7, possible assignment of peers to the free seat held by the right-most peer in layer $r_i$ is indicated by means of the four dashed lines.

In a second step, each peer u in $P(r_{i+1})$ makes a request $d_{uk}$ for each single sub-stream k being unassigned for that peer. The uploading seats are all the available seats $s_a(u)$ for each peer u in $P(r_i)$. Thus, an LSAP is formulated on the basis of the predetermined metric, and the assignment value attained as a result thereof indicates, with reference FIG. 8, that the right-most peer in layer $r_i$ will upload sub-stream 2 to the right-most peer in layer $r_{i+1}$. Hence, this upload is made even though the two peers are not responsible for the same sub-stream. However, the peers arranged in the first layer no longer have any unutilized capacity, which advantageously is an effective approach of streaming data content. Further, the number of hops is reduced for the right-most peer in the second layer, which directly translates into a smaller playback delay. Finally, this approach frees capacity which otherwise would have been utilized from layer $r_{i+1}$ for distributing the particular sub-stream.

Figure 8:
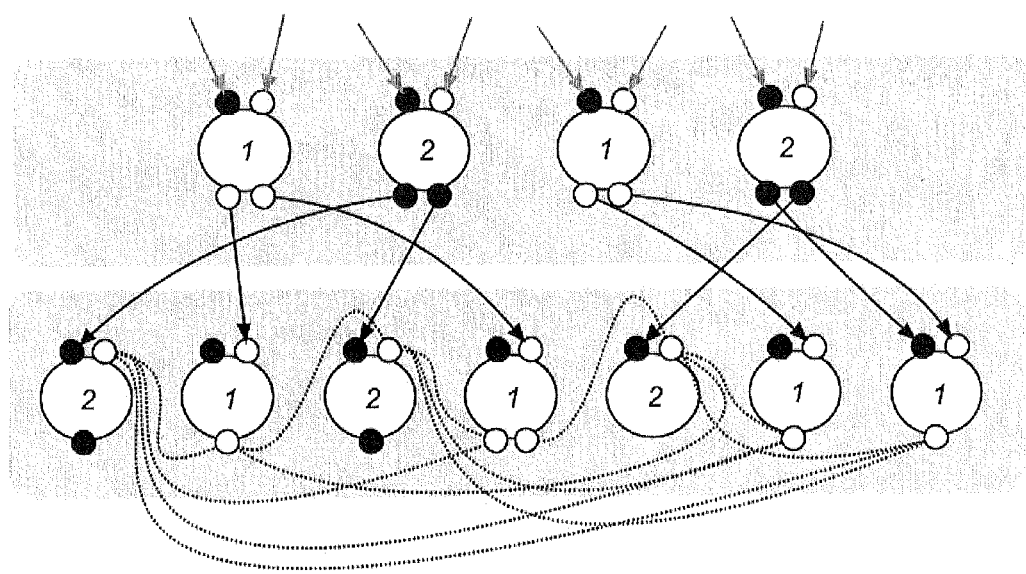
FIG. 8 illustrates peer assignment according to a further embodiment of the present invention.

FIG. 8 further illustrates that in accordance with embodiments of the present invention, a peer is allowed to upload the sub-stream for which it is responsible to other peers in the same layer which are responsible for other sub-streams. In FIG. 8, the peers in the second layer have still not yet been provided with one of the two sub-streams necessary to render the data content streamed by the streaming source. These possible assignments—i.e. assignment of peers in the second layer to seats in the second layer for downloading the remaining required sub-stream—are indicated by means of dotted lines. For example, as can be seen, the left-most peer in layer $r_{i+1}$ can download sub-stream 1 from either one of four different peers in layer $r_{i+1}$ belonging to a set responsible for distribution of sub-stream 1.

Figure 9:
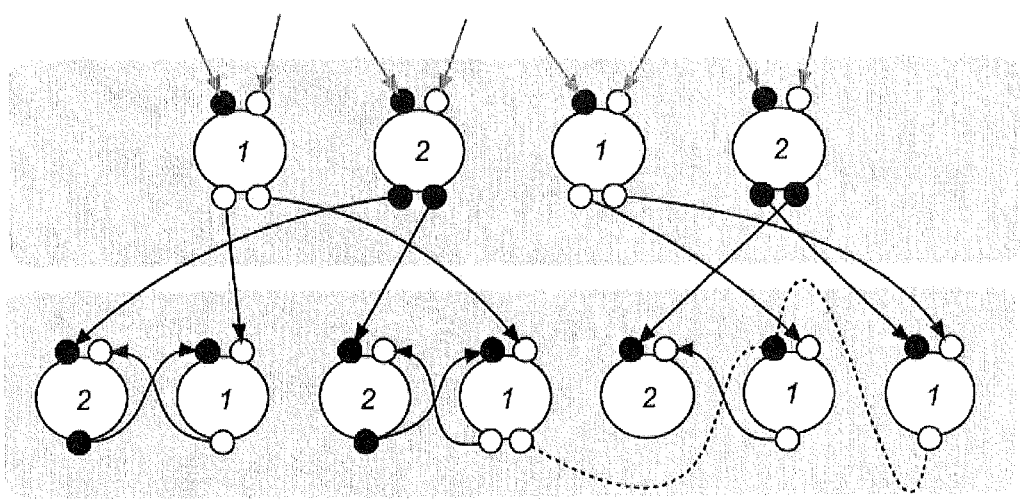
FIG. 9 illustrates peer assignment according to still a further embodiment of the present invention.

Thus, in a third step, each peer u in $P(r_{i+1})$ makes a request $d_{uk}$ for the single sub-stream k. The uploading seats are all the available seats for the peers in $\psi(r_i, k)$. This is repeated for $\forall k \in \{1, \ldots, h\}$. Again, an LSAP is formulated on the basis of the predetermined metric, and an assignment value is attained as a result thereof. With reference made to FIG. 9, the peers are seated on the basis of this assignment value, which is indicated by means of continuous lines. For the example left-most peer in the second layer, it is determined from the attained assignment value that download of sub-stream 1 should be effected from its adjacent peer in the same layer.

Now, as can be seen in FIG. 9, all peers in layer $r_{i+1}$ are provided for, i.e. have downloaded both sub-streams such that the data content can be fully rendered, except for the second peer from the right. Only two peers out of all peers (in both layers) have free capacity to upload further sub-streams, which is indicated by means of dashed lines. However, as can be deducted from FIG. 9, these two peers are effectively responsible for uploading sub-stream 1, and not sub-stream 2 required by the second peer from the right in layer $r_{i+1}$. On the other hand, these two peers have capacity, and the only other viable option would be to download from the streaming source, which is not desirable. Hence, in an embodiment of the present invention, this is solved by having any one of the two peers with spare capacity uploading the requested sub-stream to the peer which is not yet fully provided for. Thus, in a fourth step, each peer u in $P(r_{i+1})$ makes a request $d_{uk}$ for each sub-stream k that is unassigned for that peer. The uploading seats are all the available seats $s_a(u)$ for each peer u in $P(r_i)$. Once again, an LSAP is formulated on the basis of the predetermined metric, and an assignment value stipulates from which peer download of the required sub-stream should be performed.

Figure 10:
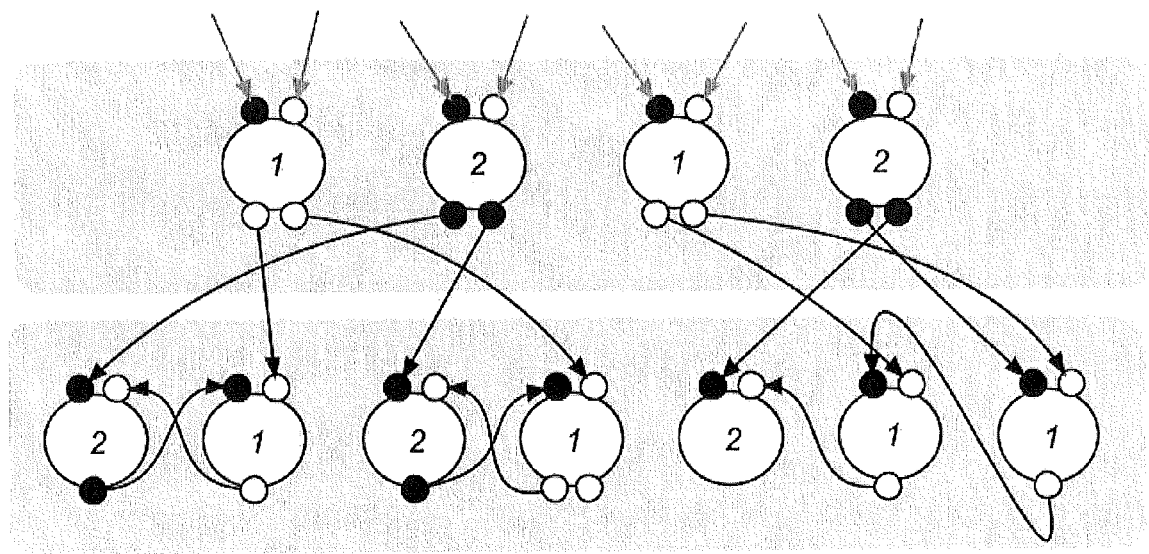
FIG. 10 illustrates peer assignment according to yet a further embodiment of the present invention.

FIG. 10 shows the final assignment; the calculated assignment value designates the right most peer in the second layer as the peer that will be uploading sub-stream 2 to its adjacent peer which is now fully provided for. Thus, the right-most peer will upload sub-stream 2 even though it effectively is responsible for uploading sub-stream 1, since sub-stream 2 otherwise would have to be uploaded from the streaming source. Hence, it is preferred from a bandwidth utilization point of view to download a required sub-stream from another peer—even though that particular peer does not belong to a peer set being responsible for the required sub-stream—than to burden the streaming source with the download.

Now, as can be seen in FIG. 9, all peers in layer $r_{i+1}$ are provided for, i.e. have downloaded both sub-streams such that the data content can be fully rendered, except for the second peer from the right. Only two peers out of all peers (in both layers) have free capacity to upload further sub-streams, which is indicated by means of dashed lines. However, as can be deducted from FIG. 9, these two peers are effectively responsible for uploading sub-stream 1, and not sub-stream 2 required by the second peer from the right in layer $r_{i+1}$. On the other hand, these two peers have capacity, and the only other viable option would be to download from the streaming source, which is not desirable. Hence, in an embodiment of the present invention, this is solved by having any one of the two peers with spare capacity uploading the requested sub-stream to the peer which is not yet fully provided for.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of arranging a P2P overlay network comprising a streaming source and a plurality of peers arranged in distribution layers, the streaming source being arranged to divide data content to be streamed into a plurality of content sub-streams together forming the data content and to distribute the plurality of content sub-streams to the network peers, the method comprising:
   determining in which one of the distribution layers an individual peer is to be arranged;
   grouping the peers into a number of peer sets, each peer set being grouped to comprise peers from the same distribution layer and further being arranged to be responsible for distributing a respective content sub-stream; and
   assigning to each peer set a task of distributing said respective content sub-stream to peers of other peer sets arranged in the same distribution layer and to peers arranged in an immediately subsequent distribution layer which further belongs to a peer set being responsible for the distributed respective content sub-stream.

2. The method of claim 1, further comprising:
   instructing peers in the distribution layer being arranged closest to the streaming source to connect to the streaming source, and to at least another peer being arranged in the same distribution layer but belonging to another peer set, for downloading the content sub-streams.

3. The method of claim 1, further comprising:
   instructing the streaming source to distribute the different content sub-streams in a substantially equal number to the distribution layer being arranged closest to the streaming source.

4. The method of claim 1, further comprising:
   instructing the peers of each distribution layer to distribute the different content sub-streams in a substantially equal number.

5. The method of claim 1, wherein the determining in which one of the distribution layers an individual peer is to be arranged comprises:
   determining for each distribution layer, starting from the layer hosting the streaming source, the maximum number of sub-streams that can be distributed to peers to be arranged in an individual distribution layer as the sum of the number of sub-streams that can be distributed from said individual distribution layer and the number of sub-streams that can be distributed from the immediately preceding distribution layer, and
   arranging the peers in the distribution layers until all peers have been assigned to a respective distribution layer.

6. The method of claim 5, further comprising:
   setting the maximum number of sub-streams that can be distributed to peers to be arranged in an individual distribution layer to be equal to the number of sub-streams that can be distributed from the immediately preceding distribution layer, in case said sum exceeds the number of sub-streams that can be distributed from the immediately preceding distribution layer.

7. The method of claim 1, further comprising:
   instructing each peer in the respective peer set to download its respective content sub-stream from a peer in an immediately preceding distribution layer and to download remaining content sub-streams from peers of the other peer sets arranged in the same distribution layer.

8. The method of claim 1, wherein the instructing of each peer in the respective peer set to download the respective content sub-stream from a peer in an immediately preceding distribution layer and to download remaining content sub-streams from peers of the other peer sets arranged in the same distribution layer comprises:
   determining, for each peer set in the immediately preceding distribution layer with respect to the instructed peer, the number of sub-streams that the respective peer set is capable of distributing; and
   selecting said respective content sub-stream for download from the peer set having smallest determined distribution capability.

9. The method of claim 1, further comprising:
   assigning to at least one selected peer a task of distributing the respective content sub-stream for which it is responsible to at least one peer arranged in an immediately subsequent distribution layer requiring said respective content sub-stream, but being responsible for a different sub-stream, in case the at least one selected peer has unutilized distribution capacity.

10. The method of claim 1, further comprising:
    assigning to at least one selected peer a task of distributing at least one content sub-stream for which it is not responsible but has downloaded, to at least one peer arranged in the same distribution layer requiring the at least one content sub-stream, in case said at least one peer arranged in the same distribution layer otherwise would have to download the required content sub-stream from the streaming source.

11. The method according to claim 1, further comprising:
    assigning a peer arranged in a particular distribution layer to a peer in an immediately preceding distribution layer by means of:
    formulating a Linear Sum Assignment Problem (LSAP) based on a predetermined metric;
    calculating an assignment value from the LSAP representing a quality measure of the predetermined metric for each possible assignment to peers in the immediately preceding distribution layer; and
    selecting the peer in the immediately preceding distribution layer, to which the peer in said particular distribution layer is to be assigned, on the basis of the calculated quality measure.

12. The method according to claim 1, further comprising:
    assigning a peer arranged in a particular distribution layer to another peer in the same particular distribution layer by means of:
    formulating a Linear Sum Assignment Problem (LSAP) based on a predetermined metric;
    calculating an assignment value from the LSAP representing a quality measure of the predetermined metric for each possible assignment to other peers in the same particular layer; and
    selecting the other peer in the same particular distribution layer, to which the peer in the particular layer is to be assigned, on the basis of the calculated quality measure.

13. A device for arranging a P2P overlay network comprising a streaming source and a plurality of peers arranged in distribution layers, the streaming source being arranged to divide data content to be streamed into a plurality of content sub-streams together forming the data content and to distribute the plurality of content sub-streams to the network peers, the device comprising:

a processing unit being arranged to determine in which one of the distribution layers an individual peer is to be arranged;

group the peers into a number of peer sets, each peer set being grouped to comprise peers from the same distribution layer and further being arranged to be responsible for distributing a respective content sub-stream; and assign to each peer set a task of distributing said respective content sub-stream to peers of other peer sets arranged in the same distribution layer and to peers arranged in an immediately subsequent distribution layer which further belongs to a peer set being responsible for the distributed respective content sub-stream.

14. The device of claim 13, said processing unit further being arranged to:

instruct peers in the distribution layer being arranged closest to the streaming source to connect to the streaming source, and to at least another peer being arranged in the same distribution layer but belonging to another peer set, for downloading the content sub-streams.

15. The device of claim 13, said processing unit further being arranged to:

instruct the streaming source to distribute the different content sub-streams in a substantially equal number to the distribution layer being arranged closest to the streaming source.

16. The device of claim 13, said processing unit further being arranged to:

instruct the peers of each distribution layer to distribute the different content sub-streams in a substantially equal number.

17. The device of claim 13, said processing unit further being arranged, when determining in which one of the distribution layers an individual peer is to be arranged, to:

determine for each distribution layer, starting from the layer hosting the streaming source, the maximum number of sub-streams that can be distributed to peers to be arranged in an individual distribution layer as the sum of the number of sub-streams that can be distributed from said individual distribution layer and the number of sub-streams that can be distributed from the immediately preceding distribution layer, and arrange the peers in the distribution layers until all peers have been assigned to a respective distribution layer.

18. The device of claim 17, said processing unit further being arranged to:

set the maximum number of sub-streams that can be distributed to peers to be arranged in an individual distribution layer to be equal to the number of sub-streams that can be distributed from the immediately preceding distribution layer, in case said sum exceeds the number of sub-streams that can be distributed from the immediately preceding distribution layer.

19. The device of claim 13, said processing unit further being arranged to:

instruct each peer in the respective peer set to download its respective content sub-stream from a peer in an immediately preceding distribution layer and to download remaining content sub-streams from peers of the other peer sets arranged in the same distribution layer.

20. The device of claim 13, said processing unit further being arranged, when instructing each peer in the respective peer set to download the respective content sub-stream from a peer in an immediately preceding distribution layer and to download remaining content sub-streams from peers of the other peer sets arranged in the same distribution layer, to:

determine, for each peer set in the immediately preceding distribution layer with respect to the instructed peer, the number of sub-streams that the respective peer set is capable of distributing; and select said respective content sub-stream for download from the peer set having smallest determined distribution capability.

21. The device of claim 13, said processing unit further being arranged to:

assign to at least one selected peer a task of distributing the respective content sub-stream for which it is responsible to at least one peer arranged in an immediately subsequent distribution layer requiring said respective content sub-stream, but being responsible for a different sub-stream, in case the at least one selected peer has unutilized distribution capacity.

22. The device of claim 13, said processing unit further being arranged to:

assign to at least one selected peer a task of distributing at least one content sub-stream for which it is not responsible but has downloaded, to at least one peer arranged in the same distribution layer requiring the at least one content sub-stream, in case said at least one peer arranged in the same distribution layer otherwise would have to download the required content sub-stream from the streaming source.

23. The device of claim 13, said processing unit further being arranged to:

assign a peer arranged in a particular distribution layer to a peer in an immediately preceding distribution layer by means of:

formulating a Linear Sum Assignment Problem (LSAP) based on a predetermined metric;

calculating an assignment value from the LSAP representing a quality measure of the predetermined metric for each possible assignment to peers in the immediately preceding distribution layer; and selecting the peer in the immediately preceding distribution layer, to which the peer in said particular distribution layer is to be assigned, on the basis of the calculated quality measure.

24. The device of claim 13, said processing unit further being arranged to:

assign a peer arranged in a particular distribution layer to another peer in the same particular distribution layer by means of:

formulating a Linear Sum Assignment Problem (LSAP) based on a predetermined metric;

calculating an assignment value from the LSAP representing a quality measure of the predetermined metric for each possible assignment to other peers in the same particular layer; and selecting the other peer in the same particular distribution layer, to which the peer in the particular layer is to be assigned, on the basis of the calculated quality measure.

25. A computer program product comprising a non-transitory computer readable medium, the computer readable medium having computer program code embodied therein, the computer program code being configured perform the steps of the method recited in claim 1.

* * * * *

UNITED STATES PATENT AND TRADEMARK OFFICE
CERTIFICATE OF CORRECTION

PATENT NO.        : 8,713,194 B2
APPLICATION NO.   : 13/299981
DATED             : April 29, 2014
INVENTOR(S)       : El-Beltagy et al.

It is certified that error appears in the above-identified patent and that said Letters Patent is hereby corrected as shown below:

In the Claims:
Column 16, Claim 25, Line 63: Please correct "being configured perform"
to read -- being configured to perform --

Signed and Sealed this
Second Day of December, 2014

Michelle K. Lee
*Deputy Director of the United States Patent and Trademark Office*